United States Patent

[11] 3,537,523

| [72] | Inventors | William B. Gogarty and<br>Marion O. Son, Jr., Littleton, Colorado |
|------|-----------|------------------------------------------------------------------|
| [21] | Appl. No. | 811,847 |
| [22] | Filed     | April 1, 1969 |
| [45] | Patented  | Nov. 3, 1970 |
| [73] | Assignee  | Marathon Oil Company<br>Findlay, Ohio<br>a corporation of Ohio |

[54] DESIGN OF WELL STIMULATION FLUIDS
10 Claims, 1 Drawing Fig.

[52] U.S. Cl. .................................................... 166/305
[51] Int. Cl. ....................................................... E21b 43/22
[50] Field of Search ......................................... 166/305, 306, 307, 308, 274, 275, 273

[56] References Cited
UNITED STATES PATENTS

| 2,771,138 | 11/1956 | Beeson ........................ | 166/274 |
| 3,208,517 | 9/1965  | Binder et al. ................ | 166/274 |
| 3,275,075 | 9/1966  | Gogarty et al. .............. | 166/274 |
| 3,406,754 | 10/1968 | Gogarty ....................... | 166/273 |
| 3,412,791 | 11/1968 | Gogarty ....................... | 166/273 |
| 3,455,393 | 7/1969  | Bradley ........................ | 166/305 |
| 3,467,187 | 9/1969  | Gogarty et al. .............. | 166/273 |
| 3,467,194 | 9/1969  | Kinney et al. ............... | 166/305 |
| 3,470,958 | 10/1969 | Kinney ......................... | 166/305 |
| 3,474,865 | 10/1969 | Gogarty et al. .............. | 166/274 |

*Primary Examiner*—Stephen J. Novosad
*Attorneys*—Joseph C. Herring, Richard C. Willson, Jr. and Jack L. Hummel ABSTRACT: Stimulation of a permeable, oil-bearing subterranean formation is effected by designing a micellar dispersion to have a mobility about equal to the square root of the product of the mobility of the combination of water and oil in the reservoir times the mobility of the drive fluid, injecting from about 0.1 to about 10 barrels of the micellar dispersion per vertical foot of oil bearing formation into the formation and then injecting drive fluid to displace the micellar dispersion out into the formation.

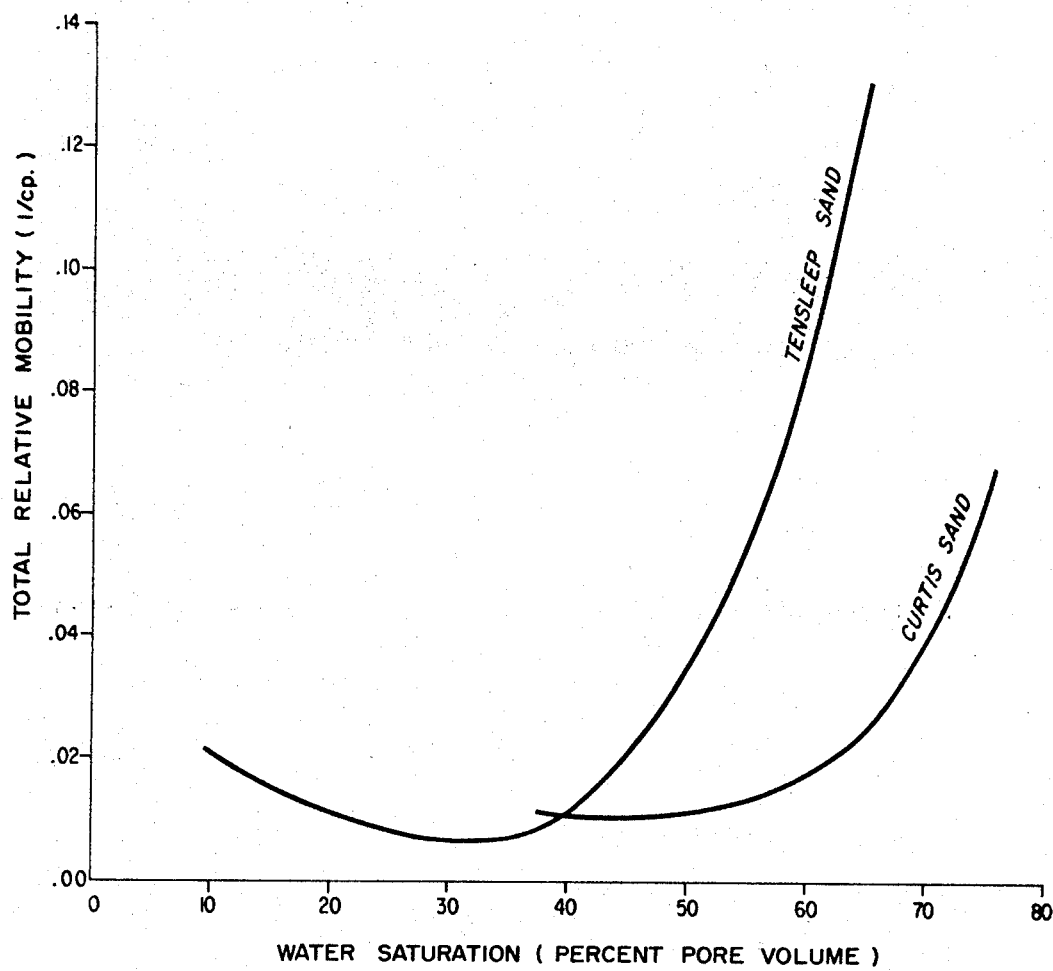

DESIGN OF WELL STIMULATION FLUIDS

BACKGROUND OF THE INVENTION

One of the basic design concepts of miscible and miscible-type displacements is to design the displacement fluid to have a mobility that is equal to or less than that of the formation fluids. This design concept permits the fluid to push out ahead of it the formation fluids and possibly rewet the reservoir rock to the desired oil-wetness or water-wetness. However, the drive fluid which displaces the fluid generally has a high mobility since it is usually water or a low molecular weight hydrocarbon. Thus, a very unfavorable mobility control is effected at the juncture of the back portion of the fluid and the drive fluid; such may cause severe fingering and inefficient displacement of the displacement agent out into the formation.

Applicants have discovered a novel design concept of stimulating wells with a stimulation fluid, preferably a micellar dispersion, wherein the stimulation fluid is designed to have a mobility which will reduce the problem caused by fingering of the drive fluid into the stimulation fluid and also efficiently displace the formation fluids and stimulation fluid out into the formation. The mobility of the stimulation fluid is designed so that the mobility ratio at the juncture of the formation fluids to the stimulation fluid is equal to the mobility ratio at the juncture of the stimulation fluid to the drive fluid.

DESCRIPTION OF THE INVENTION The FIG. graphically indicates the total relative mobility (at reservoir temperature) vs. the water saturation of the Tensleep and Curtis Sands, respectively, of the Big Horn Basin, Wyoming.

The stimulation fluid can be any fluid which effectively stimulates producing wells or water injection wells. Preferably, the stimulation fluid is a micellar dispersion.

Examples of useful stimulation fluids include miscible agents such as alcohols, LPG, $CO_2$, ketones, alkehydes, etc., and miscible-type agents.

The term "micellar dispersion" as used herein is meant to include micellar solutions, microemulsions, "transparent emulsions" (Blair, Jr. et al, U.S. Pat. No. 2,356,205), aqueous soluble oils, and micellar solution technology taught in C.G. Sumner, Clayton's The Theory of Emulsions and Their Technical Treatment, Fifth Edition, pages 315—320, (1954). Specific examples of useful oil-external micellar solutions include those defined in U.S. Pat. Nos. 3,254,714 and 3,275,075 to Gogarty et al., and 3,307,628 to Sena. Examples of useful water-external micellar dispersions include those defined in U.S. Ser. Nos. 693,099 and 693,125 to Jones. The art recognizes the differences between micellar dispersion technology and emulsion technology, one of the major differences being that the equilibrium of the micellar dispersion tends towards further dispersion of the internal phase whereas the equilibrium of an emulsion tends toward coalescence of the internal phase.

The micellar dispersion is composed of hydrocarbon, aqueous medium, and surfactant. Cosurfactant(s) and electrolyte(s) can optionally be incorporated within the micellar dispersion. Examples of volume amounts include from about 4 percent to about 60 percent or more of hydrocarbon, from about 20 percent or less to about 90 percent of aqueous medium, at least about 4 percent surfactant, about 0.01 to about 20 percent cosurfactant (also identified as cosolubilizer and semipolar organic compound) and from about 0.001 to about 5 percent or more (weight percent based on aqueous medium) of electrolyte. Optionally, other components compatible with the micellar dispersion can be incorporated to impart desired characteristics to the micellar dispersion.

The micellar dispersion can be oil-external or water-external. A particularly useful dispersion is an oil-external micellar dispersion having the capability of a large uptake of water and exhibiting lower viscosities upon the addition of water.

Hydrocarbons useful with the micellar dispersion include crude oil, partially refined fractions of crude oil, refined fractions of crude oil, and like materials. Specific examples include crude column overheads, side cuts from crude columns, gas oils, kerosenes, heavy naphtha, naphthas, straight run gasoline, liquefied petroleum gases, propane, pentane, heptane, cyclohexane, aryl compounds, substituted aryl compounds, etc. Preferably, the hydrocarbon can be characteristic of the hydrocarbon connate to the particular formation being treated, i.e. the physical makeup of the hydrocarbon can be very similar to the physical makeup of the connate hydrocarbon. The unsulfonated hydrocarbon within petroleum sulfonate, e.g. unsulfonated gas-oils, are also useful as the hydrocarbon.

The aqueous medium can be a soft water, a brine water, or a brackish water. Where the aqueous medium does contain ions, it is preferred that the ions are compatible with the ions in the formation water.

Surfactants useful with the micellar dispersion include anionic, nonionic, and cationic surfactants. Specific examples of surfactant include those found in U.S. Pat. No. 3,254,714. Other useful surfactants include Duponol WAQE (a 30 percent active sodium lauryl sulfate marketed by DuPont Chemical Corporation, Wilmington, Delaware), Energetic W-100 (a polyoxyethylene alkyl phenol marketed by Armour Chemical Company, Chicago, Illinois), Triton X-100 (an alkylphenoxy polyethoxy ethanol marketed by Rohm & Haas, Philadephia, Pennsylvania) and Arquad 12—50 (a 50 percent active dodecyl trimethyl ammonium chloride marketed by Armour Chemical Company, Chicago, Illinois), and like materials.

Preferably, the surfactant is a petroleum sulfonate, also known as alkyl aryl naphthenic sulfonate. A particularly useful sulfonate is one having an average equivalent weight within the range of from about 360 to about 520 and contains a monovalent cation, e.g. sodium or ammonium petroleum sulfonate. More preferably, the equivalent weight of the sulfonate can be 400 to about 450. In addition, the surfactant can be a combination of two or more surfactants, and can be a mixture of low, medium, and high equivalent weight sulfonates having an average equivalent weight within the above-indicated ranges.

Cosurfactants useful with the invention include alcohols, amino compounds, esters, ketones, aldehydes and like materials containing from one to about 20 or more carbon atoms. Preferably the surfactant contains from about three to about 16 carbon atoms and specific examples include isopropanol, n- and iso- butanol, amyl alcohols such as n-amyl alcohol, 1- and 2- hexanol, 1- and 2- octanol, decylalcohols, dodecylalcohols, alkaryl alcohols such as p-nonylphenol and alcoholic liquors such as fusel oil, and like materials. Preferably, the cosurfactant can be present in concentrations within the range of from about 0.1 to about 5 percent. Mixtures of two or more cosurfactants are useful as are two or more different cosurfactants within the same class of cosurfactants, i.e. amyl and 1-hexanol and optionally p-nonyl phenol.

Electrolytes useful in the invention include organic salts, inorganic bases, inorganic acids, organic acids, organic bases, and organic salts. Preferably, the electrolyte is one compatible with the sands within the subterranean formation. Specific examples of electrolytes include sodium hydroxide, sodium chloride, sodium sulfate, hydrochloric acid, sulfuric acid, and those electrolytes taught in U.S. Pat. Nos. 3,330,343 to Tosch et al. and 3,297,084 to Gogarty et al. The electrolytes can be the salts or ions within the aqueous medium, i.e. within the brine or brackish waters. The type and concentration of electrolyte will depend on the aqueous medium, surfactant, cosurfactant, hydrocarbon, and the reservoir conditions, including temperature of the reservoir.

The mobility of the stimulation fluid should be designed such that the most stable flow in the entire stimulation process is obtained. Such is effected by designing the stimulation fluid to have a mobility ratio at the juncture of the connate fluids and the stimulation fluid equal to the mobility ratio at the juncture of the stimulation fluid and the drive fluid. This design concept is illustrated by the formula:

$$\frac{M_s}{M_w} = \frac{M_{ow}}{M_s}$$

$$M_s = \sqrt{M_{ow}M_w}$$

wherein $M_s$ is equal to the mobility of the stimulation fluid, $M_w$ is equal to the mobility of the drive fluid (can be water), and $M_{ow}$ is equal to the mobility of the formation fluids, *i.e.* the oil and water in the formation. This design concept gives efficient displacement of the formation fluids and the stimulation fluid out into the reservoir.

This invention includes the stimulation of production wells and water injection wells, thus the productivity index and the injectivity index of the wells can be increased by using the design concepts of this invention. This invention is particularly useful with water injection wells wherein the injectivity index is substantially increased.

The drive fluid can be aqueous or hydrocarbon. A particularly useful drive fluid is water and more preferably water containing ions compatible with the ions within the subterranean formation and/or any ions within the stimulation fluid.

Stimulation of the formation is obtained by injecting through an injection means, *i.e.* a well in fluid communication with the formation, from about 0.1 or less to about 10 or more barrels of the stimulation fluid per vertical foot of the formation to be stimulated. Larger amounts can be injected, however, it may be economically unattractive for the results obtained. Preferably, from about 1 to about 5 barrels of the stimulation fluid is injected per vertical foot of the formation. After the stimulation fluid, preferably micellar dispersion, is injected into the formation, sufficient drive fluid, *e.g.* drive water, is injected to displace the stimulation fluid out into the formation, preferably out to a distance of at least about 7 to 15 feet.

The following example is submitted to teach specific working embodiments of the invention.

EXAMPLE I

Core samples 1 inch in diameter by 3 inches long are obtained from the Tensleep Sand and the Curtis Sand, Big Horn Basin, Wyoming. The attached FIG. indicates the total relative mobility (determined at reservoir temperature) of these sands vs. the water saturation. The specific permeabilities of the Tensleep Sand and the Curtis Sand are 489 md. and 103 md. respectively. These samples are stimulated with one pore volume of a micellar solution containing the following volume percents: 6 percent of sodium petroleum sulfonate (Petronate K, a tradename of Sonneborn Chemical Co., 300 Park Avenue South, New York, New York, 10010, average molecular weight about 440, about 62 percent active sulfonate), 6 percent of sodium petroleum sulfonate (Pyronate 50, a tradename of Sonneborn Chemical Co., average molecular weight about 350—375, about 50 percent active sulfonate), 40 percent kerosene, and 47 percent water (contains 0.25 percent by weight sodium chloride) and about 1 percent amyl alcohol. The amyl alcohol is increased to obtain the lower viscosity micellar solutions as indicated in table 1. Indication of stimulation is given by the "stimulation ratio". This ratio is determined by obtaining the effective permeability of the core samples by water flooding before and after stimulation. The effective permeability before stimulation is determined at residual oil saturation. Following injection of the micellar solution, water is injected until it is clear, thereafter the core permeability is determined. The stimulation ratio equals the final permeability divided by the initial permeability, thus, values greater than one indicate stimulation has taken place in the sample core. To design the mobility of the stimulation fluid, the total relative mobility curves of the attached FIG. are used. For the Tensleep and Curtis Sands, the minimum total relative mobility is 0.007 and 0.01 cp.−1, respectively. This means that the oil and water flowing in the formation ahead of the micellar solution will act as a fluid having a maximum viscosity of 143 cp. for the Tensleep Sand and 100 cp. for the Curtis Sand. Assuming that the viscosity of the drive fluid is 1 cp., *i.e.* water is used as a drive fluid to make the mobility ratios equal at the leading and trailing edge of the stimulation fluid for the Tensleep Sand requires that the stimulation fluid viscosity be about 12 cp. and about 10 cp. for the Curtis Sand. The results in table 1 indicate the benefits of this invention. Improved stimulation results for the Curtis Sand are obtained by lowering the viscosity of the miscellar solution toward the 10 cp. desired design value. For the Tensleep Sand, a high viscosity gives a favorable stimulation ratio but by lowering the viscosity of the stimulation fluid to the desired design value of 12 cp., the stimulation ratio increases significantly. These results are indicated in table 1:

TABLE 1.—CORE FLOODING RESULTS

| Sample | Core type | Permeability (md.) | Slug viscosity (cp.) | Stimulation ratio |
| --- | --- | --- | --- | --- |
| A | Curtis | 48 | 42 | 0.3 |
| B | do | 167 | 42 | 0.8 |
| C | do | 119 | 18 | 2.7 |
| D | do | 199 | 18 | 2.8 |
| E | Tensleep | 171 | 42 | 3.8 |
| F | do | 142 | 18 | 7.5 |
| G | do | 187 | 18 | 8.2 |

The invention is not intended to be limited by the specifics taught herein. Rather, all equivalents obvious to those skilled in the art are to be equated within the scope of the invention as identified within the specification and appended claims.

We claim:

1. A method of stimulating a subterranean formation in communication with an injection means wherein a stimulation fluid is injected into the formation and displaced out into the formation by a drive fluid, comprising:
   1. injecting through the injection means from about 0.1 to about 10 barrels of a stimulation fluid per vertical foot of formation to be stimulated wherein the stimulation fluid is designed to have a mobility about equal to the square root of the product of the mobility of the formation fluids multiplied by the mobility of the drive fluid; and then
   2. injecting sufficient drive fluid to displace the stimulation fluid out into the formation.

2. The method of claim 1 wherein the stimulation fluid is a micellar dispersion.

3. The method of claim 2 wherein the micellar dispersion is comprised of hydrocarbon, surfactant, and water.

4. The method of claim 3 wherein the micellar dispersion contains cosurfactant.

5. The method of claim 3 wherein the micellar dispersion contains electrolyte.

6. The method of claim 1 wherein the drive fluid is water.

7. The method of claim 1 wherein sufficient drive water is injected into the formation to displace the stimulation fluid out to a radius of at least about 7 to 15 feet.

8. A method of increasing the injectivity index of a hydrocarbon-bearing subterranean formation in communication with a water injection well comprising:
   1. injecting into the formation from about 0.1 to about 10 barrels per vertical foot of hydrocarbon-bearing formation of a micellar dispersion wherein the micellar dispersion has a mobility about equal to the square root of the product of the mobility of the formation fluids multiplied by the mobility of the drive water; and then
   2. injecting sufficient drive water to displace the micellar dispersion out into the formation.

9. The method of claim 8 wherein the micellar dispersion is comprised of hydrocarbon, surfactant, water, and cosurfactant.

10. The method of claim 9 wherein the micellar dispersion contains electrolyte.